US012210275B2

(12) United States Patent
Meyers et al.

(10) Patent No.: US 12,210,275 B2
(45) Date of Patent: Jan. 28, 2025

(54) LIGHT PROJECTOR AND LIGHT BAR ASSEMBLY

(71) Applicant: ITC Inc., Hudsonville, MI (US)

(72) Inventors: Scott Meyers, Holland, MI (US); Steve Hoek, Hudsonville, MI (US)

(73) Assignee: ITC Inc., Hudsonville, MI (US)

( * ) Notice: Subject to any disclaimer, the term of this patent is extended or adjusted under 35 U.S.C. 154(b) by 136 days.

(21) Appl. No.: 17/972,209

(22) Filed: Oct. 24, 2022

(65) Prior Publication Data

US 2023/0125300 A1   Apr. 27, 2023

Related U.S. Application Data (60) Provisional application No. 63/271,395, filed on Oct. 25, 2021.

(51) Int. Cl.
G03B 21/00   (2006.01)
G03B 21/14   (2006.01)
G03B 21/20   (2006.01)
B60Q 1/26    (2006.01)

(52) U.S. Cl.
CPC ....... G03B 21/2006 (2013.01); G03B 21/145 (2013.01); B60Q 1/2619 (2013.01)

(58) Field of Classification Search
CPC .... G03B 21/2006; G03B 21/145; B60Q 1/26; B60Q 1/2629; B60Q 1/32; B60Q 1/2696
See application file for complete search history.

(56) References Cited

U.S. PATENT DOCUMENTS

| 9,669,756 | B2 | 6/2017 | Oliverio et al. |
| 9,869,438 | B2 * | 1/2018 | Zawacki ............... G03B 29/00 |
| 10,759,348 | B2 | 9/2020 | Messenger et al. |
| 11,117,510 | B2 | 9/2021 | Weber et al. |
| 11,117,610 | B2 † | 9/2021 | Weber |
| 11,560,085 | B2 | 1/2023 | Weber et al. |
| 11,580,798 | B2 | 2/2023 | Weber et al. |
| 2002/0003696 | A1 | 1/2002 | Kalana |
| 2007/0274087 | A1 | 11/2007 | Herold |
| 2011/0211362 | A1 | 9/2011 | Heiden et al. |
| 2012/0044090 | A1 | 2/2012 | Kahler et al. |
| 2013/0229820 | A1* | 9/2013 | Jutila ..................... F21S 43/14 |
| | | | 362/545 |
| 2014/0320823 | A1 | 10/2014 | Ammar et al. |

(Continued)

FOREIGN PATENT DOCUMENTS

| EP | 3600963 A2 | 2/2020 |
| EP | 3692712 A1 | 8/2020 |

OTHER PUBLICATIONS

Canadian Office Action dated May 7, 2024, Application No. 3,179,737.

Primary Examiner — Tuan T Lam
(74) Attorney, Agent, or Firm — The Dobrusin Law Firm, PC (57) ABSTRACT

A light assembly having a projector integrally connected to a light bar. The projector and the light bar share power and control wires from a wire harness. The projector includes a projector aperture whereby light (oftentimes in a pattern or logo formation) passes therethrough and directs onto a ground surface. The projector includes a light assembly configured to hold the components for projection.

15 Claims, 8 Drawing Sheets

(56) References Cited

U.S. PATENT DOCUMENTS

| | | |
|---|---|---|
| 2015/0224919 A1 | 8/2015 | Sobecki et al. |
| 2016/0090026 A1 | 3/2016 | Oliverio et al. |
| 2018/0141486 A1 | 5/2018 | Stinson et al. |
| 2018/0361915 A1 | 12/2018 | Kuhl et al. |
| 2019/0104285 A1 | 4/2019 | Medvec |
| 2019/0111847 A1 | 4/2019 | Messenger et al. |

\* cited by examiner
† cited by third party

LIGHT PROJECTOR AND LIGHT BAR ASSEMBLY

CROSS REFERENCE TO RELATED APPLICATIONS

This application claims priority and benefit to Provisional Patent Application Ser. No. 63/271,395 filed on Oct. 25, 2021.

TECHNICAL FIELD

The present specification generally relates to light assemblies for vehicles and, more specifically, a light projector for projecting light patterns onto the ground from a vehicle wherein said projector is integrated with a light bar.

BACKGROUND

It is well known in the art to equip vehicles with welcome lights or projector lights which project light, patterns and/or logos onto the ground. Light bars to illuminate the ground are also known. However, it is always desirable to reduce the number of parts in a vehicle to reduce cost, number of parts, and weight. Furthermore, it is often desirable to add a projector to an already existing vehicle.

Accordingly, there exists a need in the art to provide an improved projector overcoming the aforementioned disadvantages.

SUMMARY

A light assembly having a projector integrally connected to a light bar. The projector and the light bar share power and control wires from a wire harness. The projector includes a projector aperture whereby light (oftentimes in a pattern or logo formation) passes therethrough and directs onto a ground surface. The projector includes a light assembly configured to hold the components for projection.

A light projector assembly having a projector integrally connected to a light bar, the projector and the light bar sharing power and control wires from a wire harness, the projector having a projector aperture whereby light passes therethrough and directs onto a ground surface, the projector includes a light assembly configured to hold the components for projection, the light assembly being clear allowing light to pass therethrough, and the light assembly being sealed so as to protect the projector and lens components wherein the lens components are sealed within the light assembly, a first power source wire is soldered directly to a printed circuit board in a projector housing, a second power source wire soldered to the printed circuit board and extending to the light bar, wherein reducing wires and providing for a pass-through power configuration reduces parts and thus cost to the vehicle.

In some embodiments, the light components includes a lens stack. The lens stack may have minimized or reduced heights size and include a customizable image slide wherein the customizable image slide enables customization with preferred logos and/or patterns for projection onto a ground surface. In some embodiments, a cover is configured to house and cover the light assembly. In some embodiments, the lens stack comprises a collimation lens set, an image slide, and a zoom and aberration lens set. In some embodiments, the cover includes an endcap and covers a front portion of the light assembly. The first cover may connect to the second cover and covers a rear portion of the light assembly. In some embodiments, the endcaps cover both the first section and the second section of the cover so as to retain the light assembly onto the end of the light bar. Potting material may be used inside of the cover to seal from external environmental conditions.

A light projector assembly having a projector integrally connected to a light bar, the projector and the light bar sharing power and control wires from a wire harness, the projector having a projector aperture whereby light passes therethrough and directs onto a ground surface, the projector includes a light assembly configured to hold the components for projection, a lens stack, the lens stack including a collimation lens set, an image slide, and a zoom and aberration lens set, and the light assembly being sealed so as to protect the projector and lens components wherein the lens components are sealed within the light assembly, wherein reducing wires and providing for a pass-through power configuration reduces parts and thus cost to the vehicle.

In some embodiments, the cover includes an endcap and covers a front portion of the light assembly. In some embodiments, the first cover connects to the second cover and covers a rear portion of the light assembly. In other embodiments, the endcaps cover both the first section and the second section of the cover so as to retain the light assembly onto the end of the light bar. Potting material may be used inside of the cover to seal from external environmental conditions. In some embodiments, a first power source wire is soldered directly to a printed circuit board in a projector housing, a second power source wire soldered to the printed circuit board and extending to the light bar.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
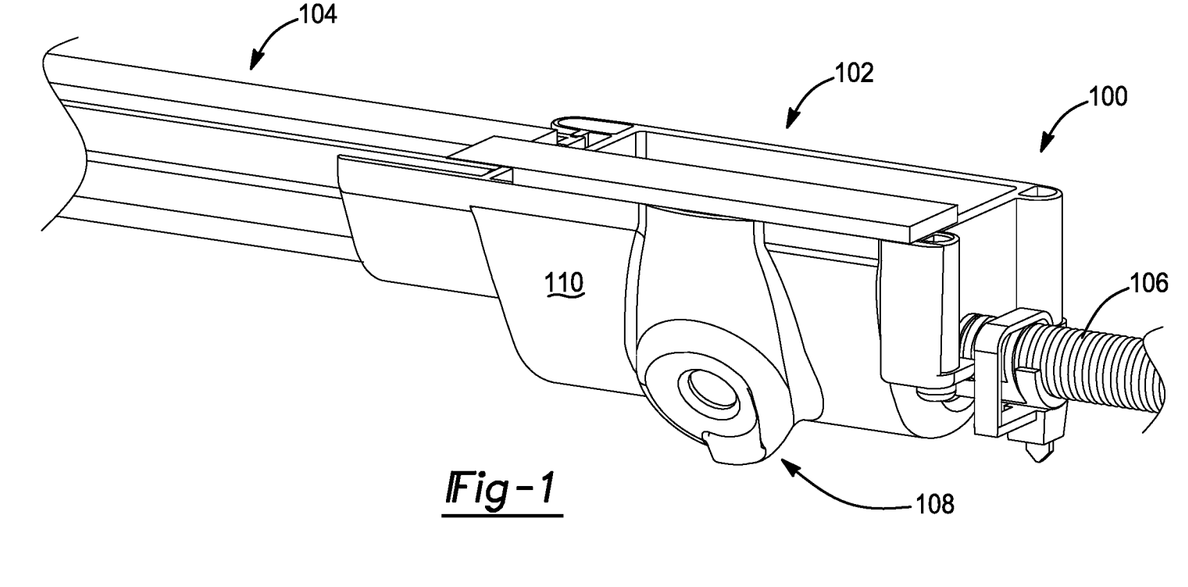
FIG. 1 depicts a perspective view of the projector and light bar assembly as disclosed herein according to one or more embodiments shown and described herein.
Figure 2:
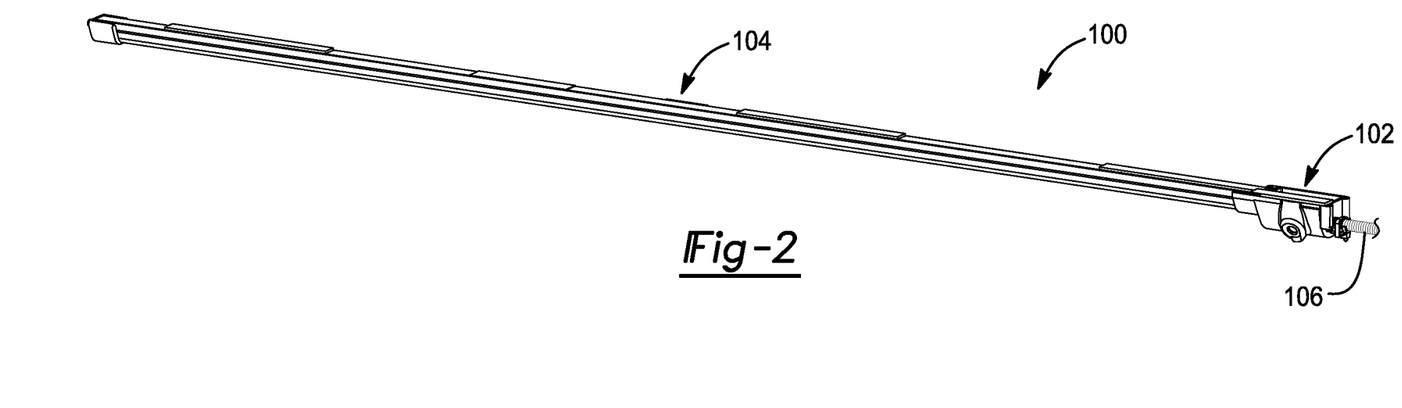
FIG. 2 depicts a panned-out perspective view of the projector and light bar assembly as disclosed herein according to one or more embodiments shown and described herein.
Figures 3, 4:
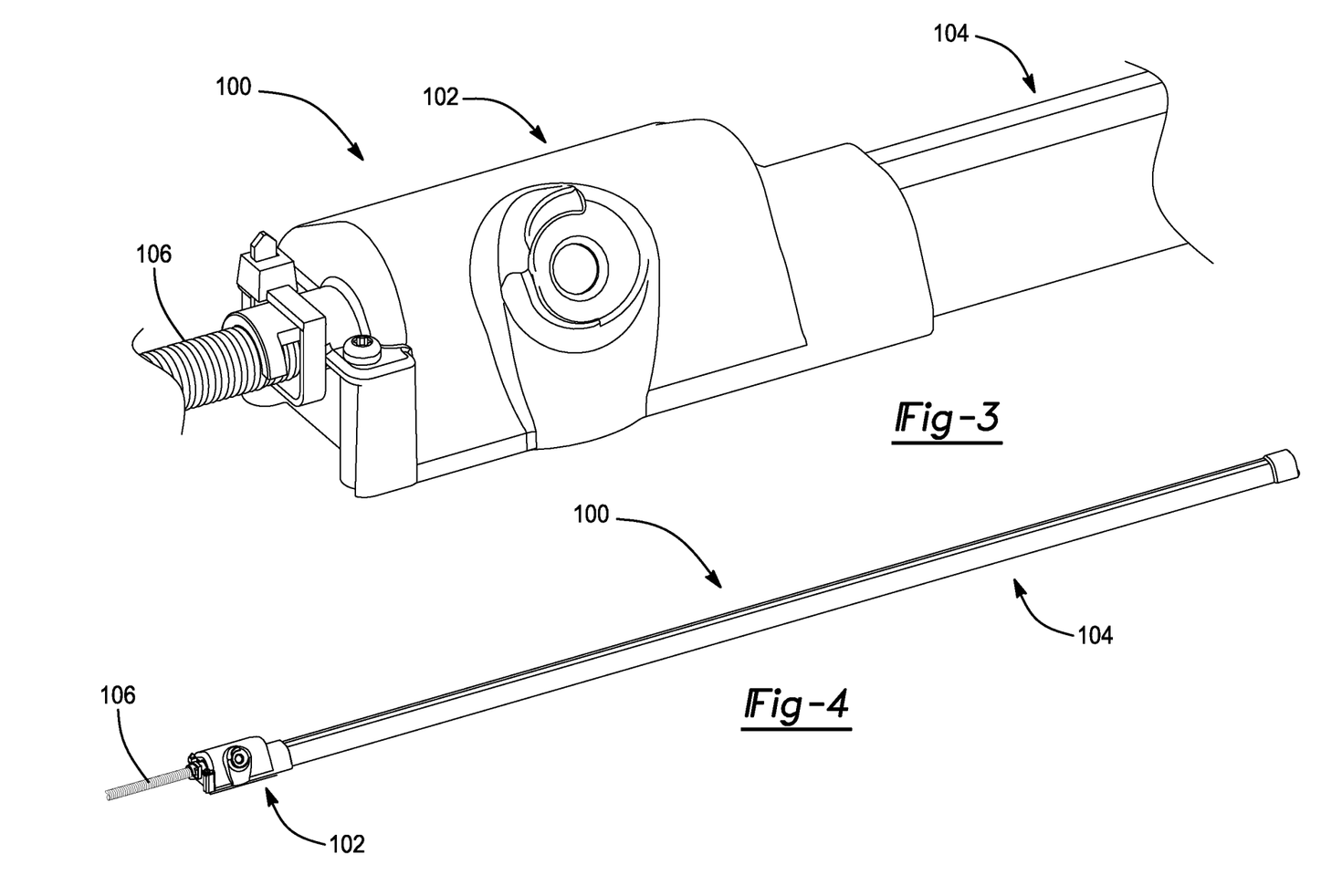
FIG. 3 depicts an alternative perspective view of the projector and light bar assembly as disclosed herein according to one or more embodiments shown and described herein.
FIG. 4 depicts an alternative panned-out perspective view of the projector and light bar assembly as disclosed herein according to one or more embodiments shown and described herein.
Figure 5:
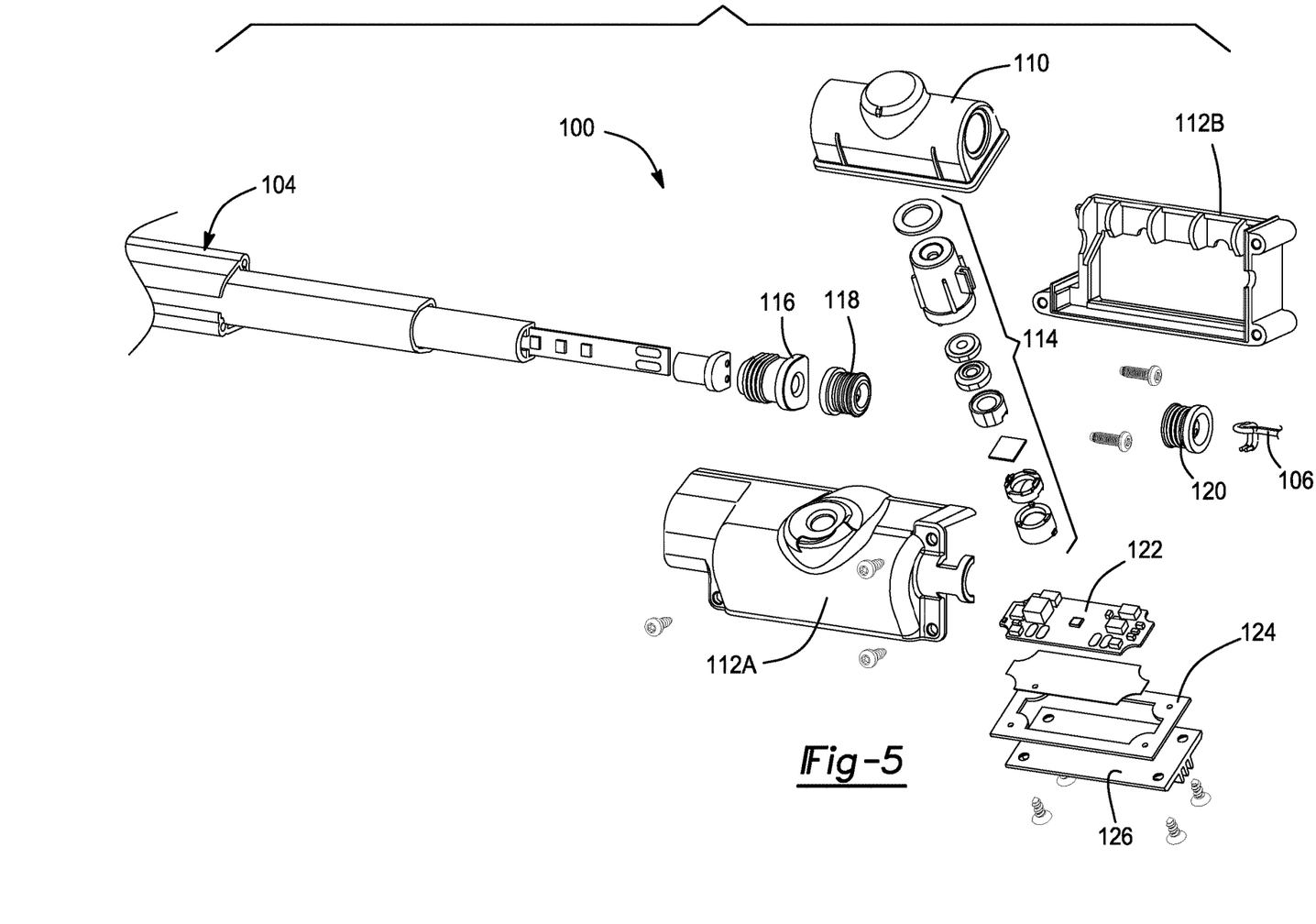
FIG. 5 depicts an exploded perspective view of the projector and light bar as disclosed herein according to one or more embodiments shown and described herein.
Figure 6:
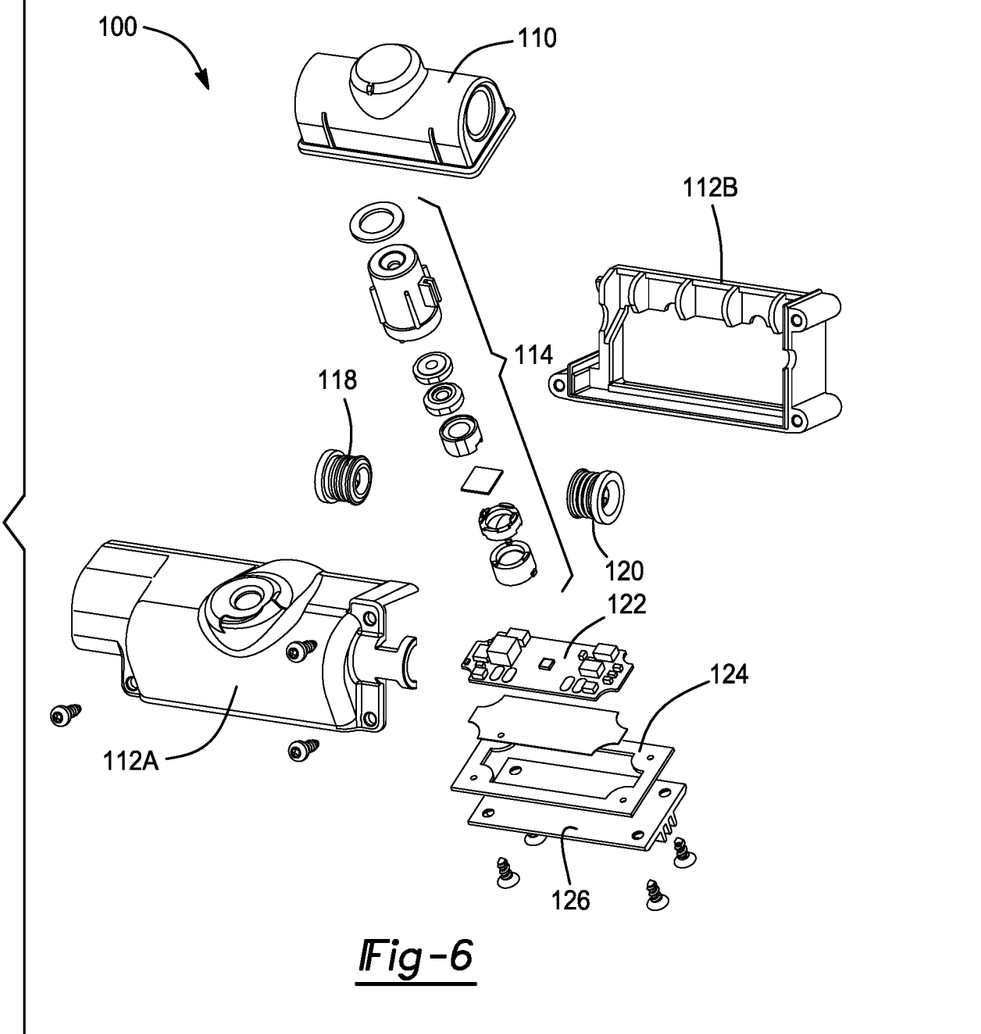
FIG. 6 depicts an exploded perspective view of the projector as disclosed herein according to one or more embodiments shown and described herein.
Figure 7:
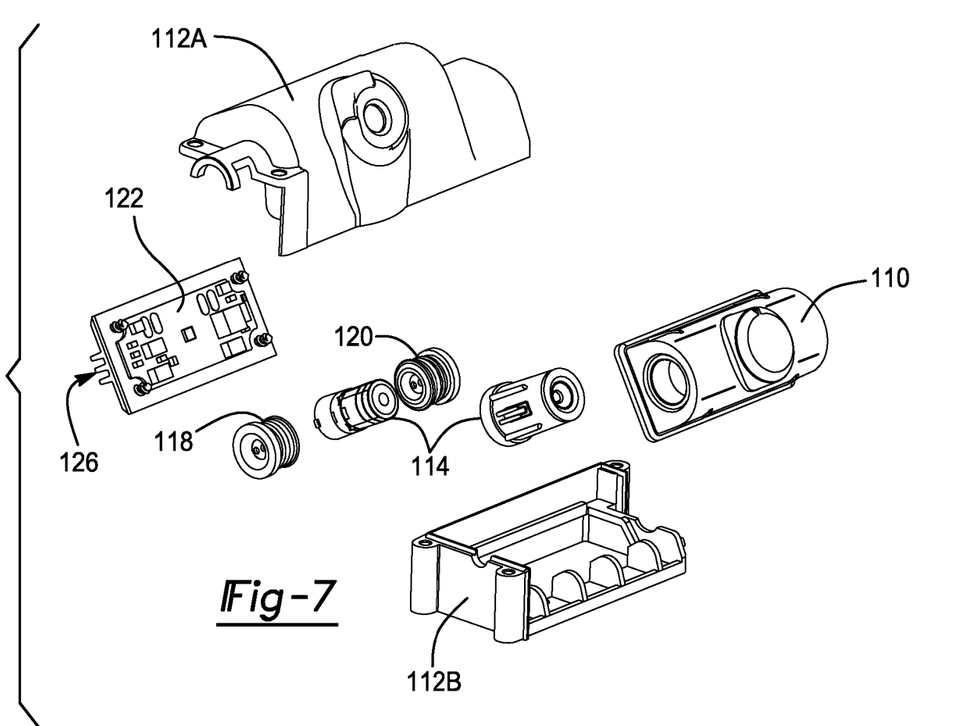
FIG. 7 depicts an alternative exploded perspective view of the projector as disclosed herein according to one or more embodiments shown and described herein.
Figure 8:
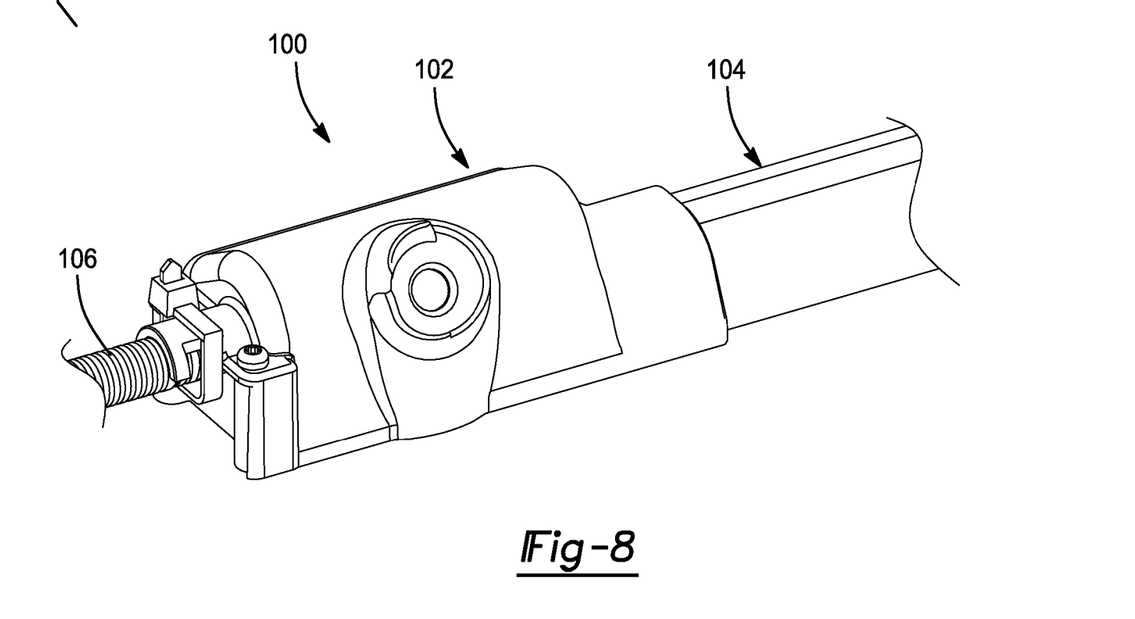
FIG. 8 depicts a perspective view of the projector as disclosed herein according to one or more embodiments shown and described herein.
Figures 9, 10:
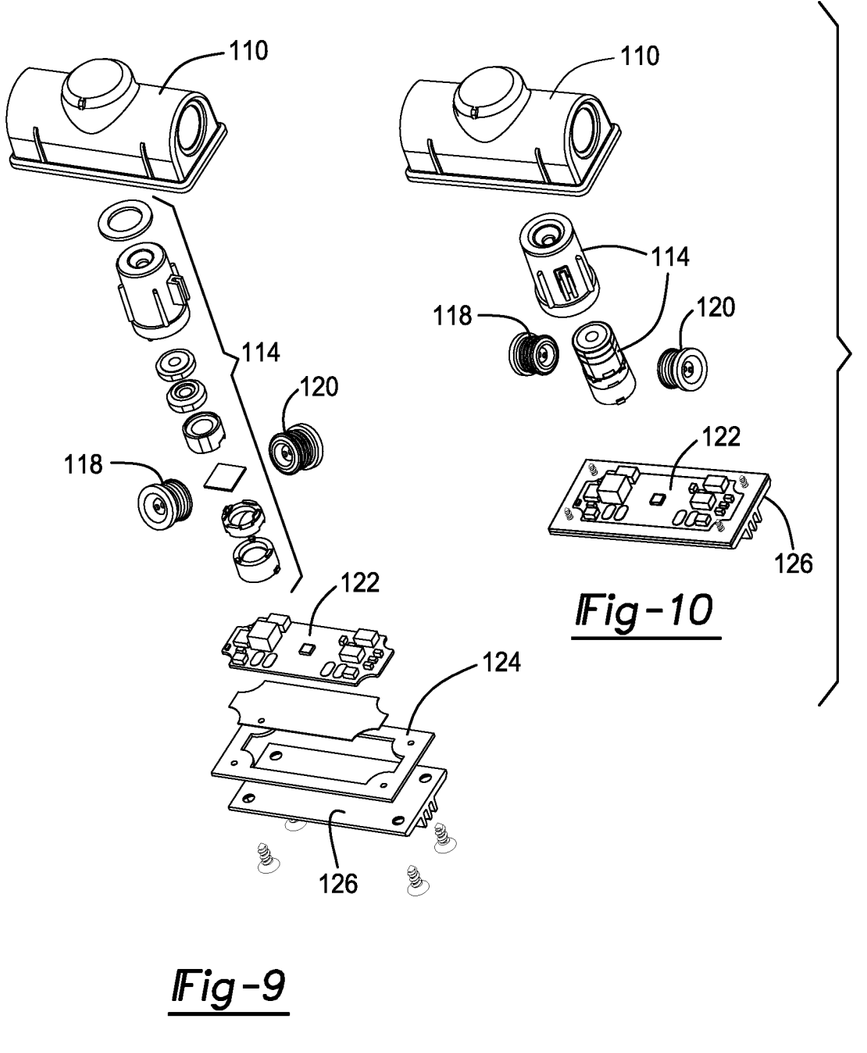
FIG. 9 depicts an exploded perspective view of the projector as disclosed herein according to one or more embodiments shown and described herein.
FIG. 10 depicts an alternative exploded perspective view of the projector as disclosed herein according to one or more embodiments shown and described herein.
Figure 11:
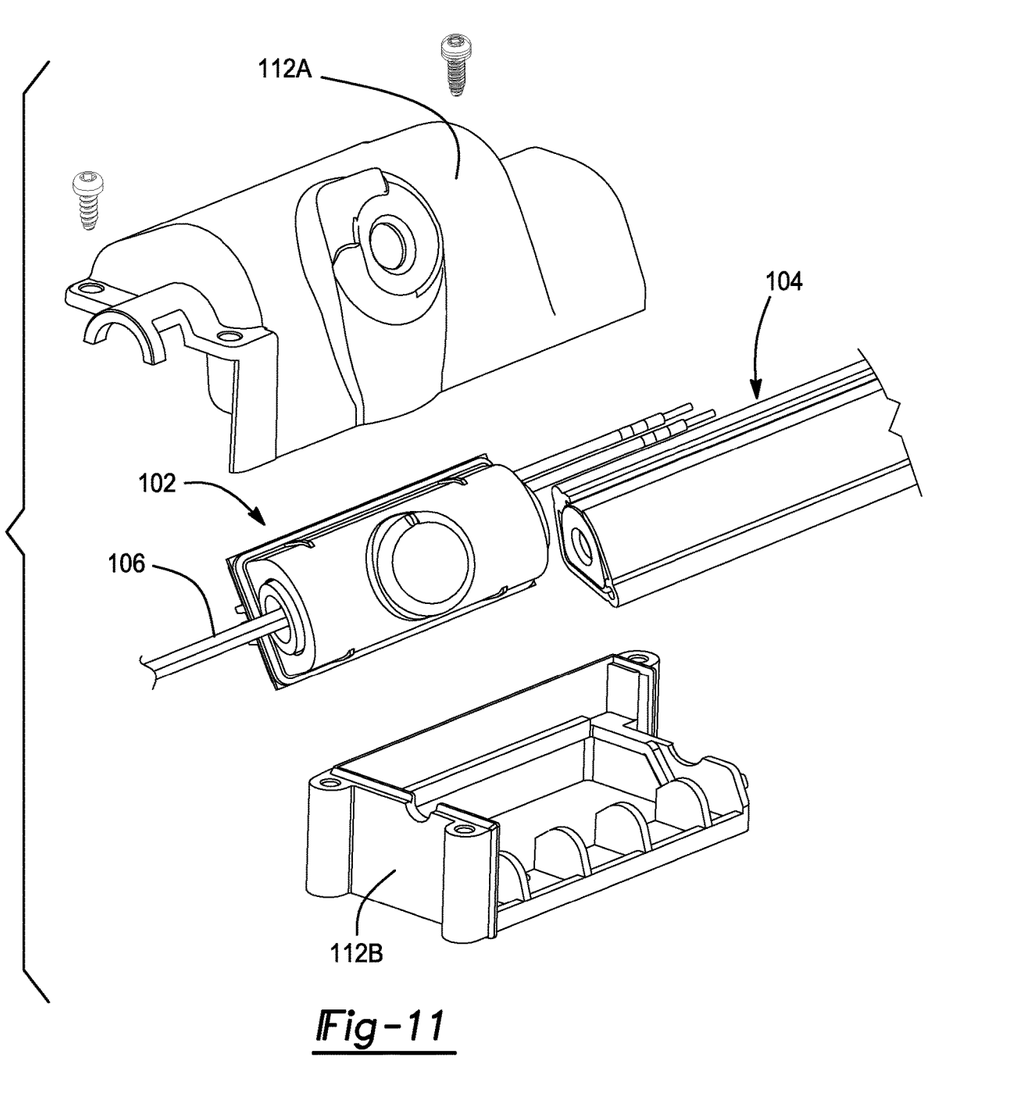
FIG. 11 depicts a partially exploded perspective view of the projector and light bar assembly as disclosed herein according to one or more embodiments shown and described herein.
Figure 12:
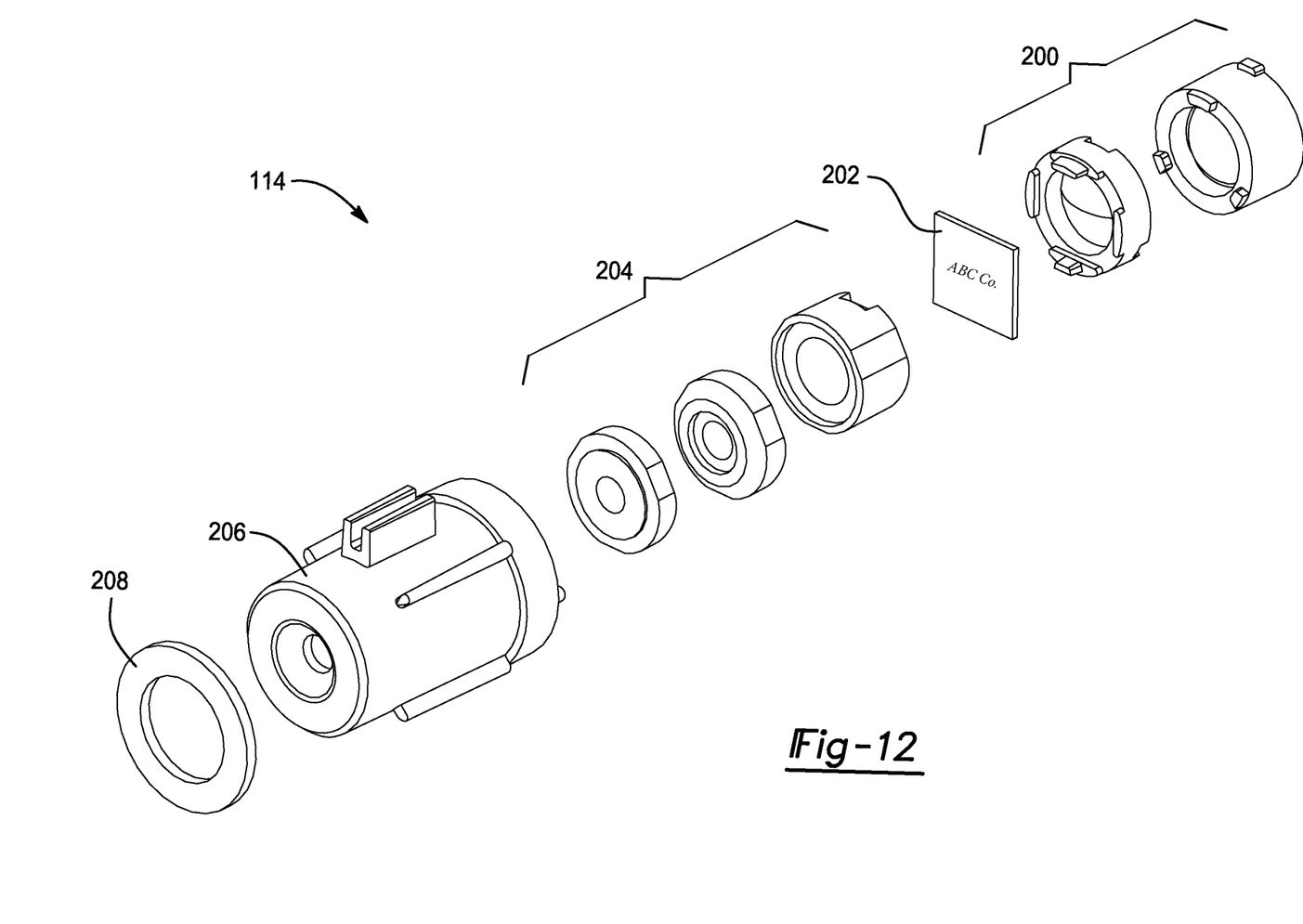
FIG. 12 depicts a perspective exploded view of the lens stack as disclosed herein according to one or more embodiments shown and described herein.

Now referring to FIG. 1, a light assembly 100 includes a projector 102 integrally connected to a light bar 104. The projector 102 and the light bar 104 share power and control wires from a wire harness 106. The projector 102 includes a projector aperture 108 whereby light (oftentimes in a pattern or logo formation) passes therethrough and directs onto a ground surface. The projector 102 includes a light pasassembly 110 configured to hold the components for projection. In some embodiments, the light assembly 110 is clear allowing light to pass therethrough. The light assembly 110 is sealed so as to protect the projector and lens components. Lens components, also referred to as a lens stack, 114 are sealed within the light assembly 110. The lens stack has a minimized or reduced heights size and include a customizable image slide. The customizable image slide enables customization with preferred logos and/or patterns for projection onto a ground surface. The lens stack 114 includes various components and elements to successfully projection an image, logo, insignia . . . etc. onto a surface from a vehicle. In the present embodiment, the lens stock 114 includes several connected elements including a collimation lens set 200, an image slide 202, a zoom and aberration lens set 204, a lens pack cylinder 206, and a foam gasket 208. In use, each of these elements are stacked together to project the image shown on the image slide 202. The collimation lens set 200 converts light source rays from diverging point to parallel light. The image slide 202 includes a basic image or shape where the keystone and aspect ratio are adjusted. The zoom and aberration lens set 204 controls image magnification and consistency of shape and focus. The lens pack cylinder 206 houses the lens stack, controls depth and orientation of lenses, and eliminates stray lights. The foam gasket 208 protects the lens stack components previously discussed and as shown and helps control depth tolerance.

The light assembly 100 further includes a cover 112A, 112B configured to house and cover the light assembly 110. The cover 112A, 112B is a two-shell piece design. Cover 112A includes an endcap and covers a front portion of the light assembly 110. Cover 112B connects to the cover 112A and covers a rear portion of the light assembly 110. Various screws and grommets 116, 118, 120 are configured to secure the assembly 100 together. The endcaps of covers 112A, 112B retain the light assembly 110 onto the end of the light bar 104 and promotes a continuous linear low-profile format. Potting material (such as silicone or other materials having similar properties) may be used inside of the cover 112A, 112B to further seal from external environmental conditions. The cover 112A, 112B is intended to further protect the light assembly 110 from impact damage.

The assembly 100 further includes a printed circuit board 122, a gasket 124 and an extruded heatsink 126 in a stacked configuration. The printed circuit board 122 ("PCB") is an LED PCB include the projector circuitry, driver circuitry and includes passthrough circuitry for the light bar 104. The heatsink 126 provides for thermal management of the LEDs and drive circuitry. The heatsink 126 is thermally coupled to the PCB 122 to promote thermal management. In the present embodiment, the passthrough circuitry eliminates additional components and thus reduces weight, number of parts, and/or cost. In the present embodiment, the power source connects directly to the projector and directly to the light bar. Specifically, a single wire connects to the projector via the PCB 122 (solder). From there a single wire from the PCB 122 extends to the light bar. As such, the number of parts are directly minimized by using a direct solder. A first power source wire from the vehicle is soldered directly to a printed circuit board 122 in a projector housing, a second power source wire soldered to the printed circuit board and extending to the light bar, wherein reducing wires and providing for a pass-through power configuration reduces parts and thus cost to the vehicle.

The assembly 100 is configured for use on a vehicle wherein the vehicle includes a vehicle body, a front door, a rear door and a rocker panel (or other trim). The assembly 100 is configured to mount to an outer perimeter to a vehicle (likely to attached to the rocker panel or connecting structure) so as to project light outwards of the outer perimeter onto the ground surface on which the vehicle rests (see photos of Appendix A).

The assembly 100 is designed and configured for quick and easy installation to one or both sides of the vehicle as desired. The assembly 100 can be sold as an aftermarket accessory that is subsequently installed to the vehicle according to preference. In other embodiment, the projector 102 of the assembly 100 is sold an auxiliary product to the light bar 104. In these embodiment, the projector may be installed after the light bar 104 is already installed, as an aftermarket product or otherwise.

The assembly 100 is advantageous in that the projector 102 is configured to use the same power source of the light bar 104. In some embodiments, if a light bar is already installed to provide a "welcome light", a power supply is already provided in the general area of the vehicle making installation easier. In other embodiments (at factory installation), the number of wires may be reduced when using the same power supply to both the projector 102 and the light bar 104 in the assembly 100. Reducing wires and providing for a pass-through power configuration reduces parts and thus cost to the vehicle.

It is noted that the terms "substantially" and "about" may be utilized herein to represent the inherent degree of uncertainty that may be attributed to any quantitative comparison, value, measurement, or other representation. Any values that may be modified by such terminology are also part of the teachings herein. For example, if a teaching recited "about 10," the skilled person should recognize that the value of 10 is also contemplated.

These terms are also utilized herein to represent the degree by which a quantitative representation may vary from a stated reference without resulting in a change in the basic function of the subject matter at issue.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

As used herein the terms "polymer" and "polymerization" are generic, and can include either or both of the more specific cases of "homo-" and copolymer" and "homo- and copolymerization", respectively.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

What is claimed is:

1. A light projector assembly comprising:
a projector integrally connected to a light bar;
the projector and the light bar sharing power and control wires from a wire harness;
the projector having a projector aperture whereby light passes therethrough and directs onto a ground surface;
the projector includes a light assembly configured to hold the components for projection;
the light assembly being clear allowing light to pass therethrough;
the light assembly being sealed so as to protect the projector and lens components wherein the lens components are sealed within the light assembly; and
a first power source wire from the vehicle is soldered directly to a printed circuit board in a projector housing, a second power source wire soldered to the printed circuit board and extending to the light bar, wherein reducing wires and providing for a pass-through power configuration reduces parts and thus cost to the vehicle.

2. The light projector assembly of claim 1 wherein the light components includes a lens stack.

3. The light projector assembly of claim 2 wherein the lens stack has a minimized or reduced heights size and include a customizable image slide wherein the customizable image slide enables customization with preferred logos and/or patterns for projection onto a ground surface.

4. The light projector assembly of claim 1 wherein a cover is configured to house and cover the light assembly.

5. The light projector assembly of claim 2 wherein the lens stack comprises a collimation lens set, an image slide, and a zoom and aberration lens set.

6. The light projector assembly of claim 5 wherein a cover includes an endcap and covers a front portion of the light assembly.

7. The light projector assembly of claim 6 wherein a first cover connects to a second cover and covers a rear portion of the light assembly.

8. The light projector assembly of claim 4 wherein endcaps cover both a first section and a second section of the cover so as to retain the light assembly onto the end of the light bar.

9. The light projector assembly of claim 4 wherein potting material is used inside of the cover to seal from external environmental conditions.

10. A light projector assembly comprising:
a projector integrally connected to a light bar;
the projector and the light bar sharing power and control wires from a wire harness;
the projector having a projector aperture whereby light passes therethrough and directs onto a ground surface;
the projector includes a light assembly configured to hold the components for projection;
a lens stack, the lens stack including a collimation lens set, an image slide, and a zoom and aberration lens set; and
the light assembly being sealed so as to protect the projector and lens components wherein the lens components are sealed within the light assembly:
wherein reducing wires and providing for a pass-through power configuration reduces parts and thus cost to the vehicle.

11. The light projector assembly of claim 10 wherein a cover includes an endcap and covers a front portion of the light assembly.

12. The light projector assembly of claim 11 wherein a first cover connects to a second cover and covers a rear portion of the light assembly.

13. The light projector assembly of claim 12 wherein endcaps cover both a first section and a second section of the cover so as to retain the light assembly onto the end of the light bar.

14. The light projector assembly of claim 13 wherein potting material is used inside of a cover to seal from external environmental conditions.

15. The light projector assembly of claim 10 wherein a first power source wire is soldered directly to a printed circuit board in a projector housing, a second power source wire soldered to the printed circuit board and extending to the light bar.

* * * * *